United States Patent [19]
Bell, Jr.

[11] 3,751,622
[45] Aug. 7, 1973

[54] PROTECTION CIRCUIT FOR ELECTRICAL DISCHARGE MACHINING POWER SUPPLY APPARATUS

[75] Inventor: Oliver A. Bell, Jr., Mooresville, N.C.

[73] Assignee: Colt Industries Operating Corp., Davidson, N.C.

[22] Filed: Jan. 17, 1972

[21] Appl. No.: 218,271

[52] U.S. Cl............................... 219/69 S, 219/69 C
[51] Int. Cl............................................... B23p 1/08
[58] Field of Search............... 219/69 C, 69 G, 69 S

[56] References Cited
UNITED STATES PATENTS

| | | | |
|---|---|---|---|
| 3,548,142 | 12/1970 | Sennowitz | 219/69 C |
| 3,629,548 | 12/1971 | Rygiol | 219/69 C X |

Primary Examiner—R. F. Staubly
Attorney—Robert C. Hauke, Harry R. Dumont et al.

[57] ABSTRACT

A protection circuit which responds to output transistor failure to provide power interruption to protect an electrical discharge machining apparatus. The parameter responded to is that drive voltage which is used to trigger the electronic output switch on and off. The protection circuit is equally applicable to single or to multiple gap machining set-ups. Field effect transistors providing high impedance operation are used to initiate interruption of the power supply for the electrical discharge machining apparatus.

10 Claims, 1 Drawing Figure

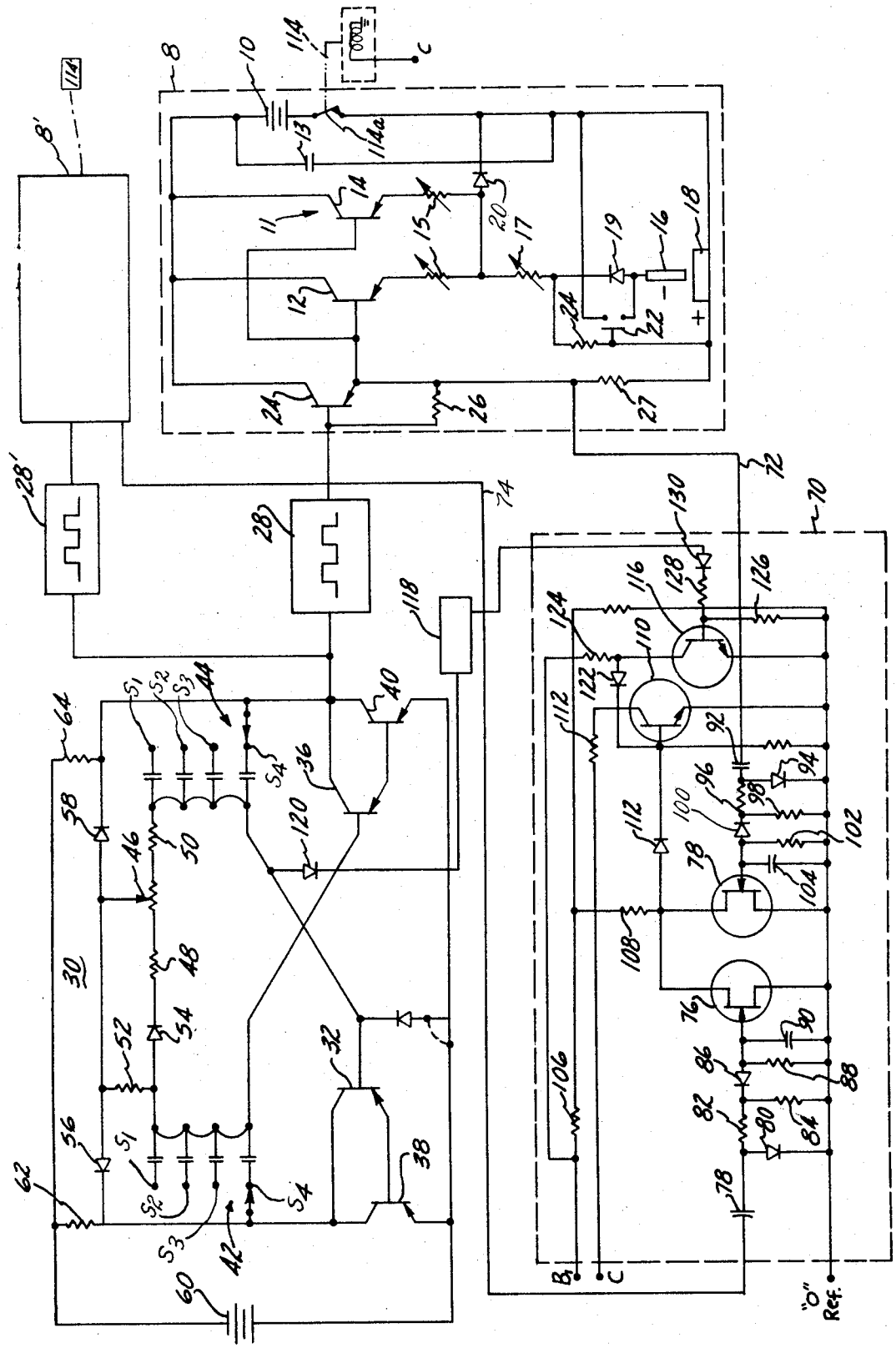

ized on June 21, 1966 for "Fault Detection and Cut-Off Circuit
PROTECTION CIRCUIT FOR ELECTRICAL DISCHARGE MACHINING POWER SUPPLY APPARATUS

REFERENCE TO RELATED APPLICATION

This application is related to my U. S. application Ser. No. 219,022 filed on Jan. 19, 1972 for Short Circuit Protective System for Electrical Discharge Machining Power Supply Apparatus.

BACKGROUND OF THE INVENTION

Certain systems are known to the prior art in which electrical parameters are responded to when these are of an abnormal level to provide interruption of the DC power supply responsive to failure of the output electronic switches in the power supply. The present invention is particularly related to the embodiment of the power supply in which the output switches are transistors, although it is equally applicable to any precision type EDM power supply in which electronic switches are used to provide machining power pulses to the machining gap. By "electronic switch" I mean any electronic control device having a plurality of electrodes comprising at least two principal or power conducting electrodes acting to control current flow in the power circuit, the conductivity of the power circuit being controlled by a control electrode within the switch whereby the conductivity of the power circuit is controlled statically or electrically without the movement of any mechanical elements within the switch. Included within this definition by way of illustration but not limitation are vacuum tubes, transistors, semi-conductor controlled rectifiers and the like.

Various prior art systems have been developed to provide for interruption of machining current responsive to transistor failure, which failure normally occurs in a shorted condition between the principal or power conducting electrodes of the output switch. One example of such a protection circuit is disclosed and claimed in Robert S. Webb, U. S. Pat. No. 3,257,580 issued on June 21, 1966 for "Fault Detection and Cut-Off Circuit for Electrical Discharge Machining Apparatus," which patent is of common ownership with the present application. The system described in that patent relates to a fault detection sensing which occurs during machining power pulses off-time across the principal electrodes of the output switch and is operable during machining pulse off-time. A further example of a transistor failure cut-off protection circuit is also shown in Kurt H. Sennowitz, U. S. Pat. No. 3,524,037, in which drive voltage level is sensed and a single stage with cut-off switch is used to initiate relay interruption of the power supply. The present invention as it will be seen responds to the drive signal magnitude which is sensed during the normal machining pulse on-time in a manner which is substantially different with regard to its mode of operation and its improved results. The present invention includes a detecting means capable of responding during each machining pulse on-time duration and an FET switch capable of maintaining a high impedance since its gate is always reverse biased.

None of the prior art circuits provide a cut-off system responsive to failure of an output transistor which is readily applicable after the manner of the circuit of applicant to either a single or a multiple type EDM machining apparatus. Additionally, the apparatus of the circuit of applicant is one which is particularly reliable and fast acting and free from transient signal conditions of the gap which may influence the cut-off circuit.

BRIEF DESCRIPTION OF THE INVENTION

The present invention incorporates a circuit which uses high impedance input type cut-off switches, namely field effect transistors, which are connected through a voltage divider network to the drive stage of the EDM power supply and respond during the drive signal period which is in phase with gap on-time to provide a cut-off when voltage during that on-time does not reach a predetermined hold-off level. This level is of course reflective of faulty switching and failure in the short condition of the output transistor or transistors which normally are parallel connected in an output switch bank.

BRIEF DESCRIPTION OF THE DRAWING

The present invention, its operation features and its advantages and advancements will be understood from the following specification together with the drawing in which like numerals are used to refer to identical parts where duplicate parts occur, and wherein:

The drawing includes a schematic showing of a power supply circuit partially in diagrammatic form and showing the detail of that portion of the circuit relating to the present invention.

DETAILED DESCRIPTION OF THE PREFERRED EMBODIMENT

The figure of the drawing shows the basic parts of an electrical discharge machining power supply apparatus which includes in its drive and output stage 8 a main machining power source 10 and a bank 11 of electronic output switches including transistors 12 and 14 both of which have their principal electrodes connected between the machining power source 10 and the machining gap, which includes a negative polarity tool electrode 16 and a positive polarity workpiece 18. A filter capacitor 13 is connected across the power source 10, which source is normally derived from an AC input and a full wave rectifier. Series resistors 15 are connected between the respective emitters of the transistors 12 and 14 and the negative gap electrode 16, while an additional adjustable resistor 17 is connected in series with a diode 19 and the gap. A separate diode 20 is connected between the lower terminal of resistor 15 and the plus terminal of the power source 10 in blocking polarity with respect to the machining gap. Also included in the gap circuit are a switch 22 and a resistor 24. The switch 22 is provided to change the gap polarity when this condition is required because of the combination of workpiece and electrode material being used.

The present invention is described with relationship to an electrical discharge machining power supply in which there are included a plurality of machining gaps so that more than one workpiece may be cut at the same time or, alternately, a segmented electrode with portions insulated one from the other may be used to cut several cavities in a single workpiece in a manner well known to the art. In the drawing, a separate machining drive and gap output stage 8' is shown above the detailed showing of the output stage 8 just described. It will further be seen that each output stage includes a drive stage incorporating a transistor 24 which is used to provide a signal to the control electrode of the output transistors 12 and 14 and thus to control their on-off time triggering. A protective resistor 26 is shown connected across the base and emitter of the drive transistor 24 and a bias resistor is connected in series with its emitter. It will be understood that in most cases more than one amplification and pulse shaping stage is required between the pulse generator output and the final drive transistor 24. Those stages are indicated in the drawing in block diagram form in blocks 28 and 28'.

The pulse generator used to provide the triggering pulses for the drive stage transistor 24 and the output transistors 12 and 14 is a free running multivibrator 30 shown at the left hand side of the drawing. Included in the multivibrator 30 as its major component are a pair of alternately operable transistors 32 and 36 which have coupled to them Darlington connected transistors 38 and 40, respectively, in order to increase the magnitude of the power output from the multivibrator. In accordance with normal astable multivibrator design, the frequency of operation is controlled by the relative magnitude of the resistor-capacitor network combinations. In the return networks, as indicated in the drawing, there are several frequency settings indicated by the letters $S_1 - S_4$. The frequency of operation of the multivibrator 30 is selected by the manual operation of the ganged switches 42 and 44. The current magnitude of the machining power pulses is controlled by the setting of the potentiometer 46 which controls the relative on-off time of the multivibrator 30. Also included in the circuit are fixed resistors 48 and 50 connected in series with the variable resistor of the potentiometer 46, a resistor 52 and diodes 54, 56 and 58 poled in the manner shown. The operating voltage for the multivibrator 30 is provided by a separate DC voltage source 60 which has in series with it a pair of current limiting resistors 62 and 64. A separate cut-off circuit 118 is shown in block form with its control output provided through a diode 120 to the base of the transistor 32. The general function and purpose of the cut-off circuit will be described hereinafter.

The present invention is primarily directed toward the circuit 70 which has the function of responding to a signal indicative of failure of the output transistors 12 and 14 and of providing a control signal to a cut-off means which is connected to the main machining power source 10 in such a way as to disconnect or interrupt the power source 10. It will further be seen that the protection circuit 70 is operable to provide a cut-off responsive to transistor failure in either of the output circuits 8 or 8' in accordance with the signal which is derived from either or both the drive signal stages. For purposes of illustration, the drive transistor 24 has connected to its emitter a sensing network including the lead 72, while the drive stage of the corresponding output network 8' has a lead 74 capable of providing a similar second signal to the protection circuit 70. The actual cut-off operation is provided responsive to the switching of either or both of a pair of field effect transistors 76 and 78. The input network to the gate electrode of the field effect transistor 76 includes a coupling capacitor 78, a diode 80, and a voltage divider network including resistors 82 and 84. This network including a series diode 86 is adapted to hold the voltage to a level sufficient to maintain field effect transistor 76 off during normal operation of the power supply circuit. A resistor 88 is included for providing a bias to the gate of the field effect transistor 76 and a capacitor 90 is connected across the resistor 88. In a like manner, a signal from the drive transistor 24 is provided through the lead 72, to a coupling capacitor 92, to the network comprising a diode 94, the voltage divider including resistors 96 and 98, and through signal diode 100 with the gate bias being provided through a resistor 102 shunted by a capacitor 104. The operating potential for the circuit is provided by a suitable B+ voltage source which is connected to the upper principal electrode of both field effect transistors 76 and 78 through a common series resistor 106 and a drain load resistor 108. Also included in this protective circuit is a NPN type transistor 110 which receives its control signal through a signal diode 112 connected to its base responsive to the triggering into conduction of either of the field effect transistors 76 or 78. The output from the transistor 110 is taken from its collector through a resistor 112 and passed to a relay 114 which controls a normally closed contact 114a operatively connected to the DC supply 110 for providing its disconnect or interruption responsive to transistor failure occurring in the output network of either the output network 8 or 8'. It will be understood that the DC source 10 normally includes a rectifier and AC input stage to which the relay contact 114a is normally connected in such manner as to interrupt the AC power input responsive to the triggering into conduction of the transistor 110. A second transistor 116 is connected in circuit with the transistor 110 so as to hold off its conduction for the duration of a gap short circuit cut-off operation which is initiated through a network 118 and includes a control output through diode 120 to the on-time control transistor 32 of the multivibrator 30. It is necessary that the transistor failure circuit be inhibited during the cut-off operation and this is made clear through my co-pending application referenced above. The signal from the transistor 116 is provided to the base of the transistor 110 through a signal diode 122. Bias to the collector of the transistor 116 is furnished through a bias resistor 124. The transistor 116 further includes a resistor 126 connected across its emitter base junction. A current limiting resistor 128 and a signal diode 130 are connected to provide the output from the cut-off circuit 118.

The mode of operation of the protection circuit 70 during a fail-short operation of one of the output transistors 12 or 14 is as follows: The input to the protection circuit 70 through the lead 72 or 74 during the machining pulse off-time is approximately zero voltage level, while at machining pulse on-time it may approach approximately minus 70 volts. During the on-time triggering action by the drive transistor 24, the signal provided to the field effect transistors 76 or 78 is of a relatively high level, which level is reduced through the action of the divider 82, 84 or 96, 98 to a level of three or four volts, which is suitable for the control of the operation of the field effect transistors 76 and 78. This negative signal during the pulse on-time charges the capacitors 90 and 104 to a negative voltage level to hold off the field effect transistors 76 and 78 so long as the output module is running with normal on-time voltage levels sensed through the drive transistor output. Upon failure of the output transistors 12 or 14 in their shorted condition in either output stage 8 or 8', the gate of the associated field effect transistor 76 or 78 drops to a voltage level such that either or both of the two field effect transistors 76 and 78 are turned on.

This provides a control signal through the diode 112 to the base of the transistor 110 which turns it off and provides a signal sufficient to operate the relay 114. The operation of the cut-off means, namely the relay 114 or 114', then serves to disconnect the power supply 10 from the output module 8 and 8' so that during the continuation of the fail-short condition of the output transistors, such as transistor 12 or 14, the power is interrupted and the gap is protected from excessive current flow which might otherwise occur.

It will be thus seen and appreciated that the transistor fail protection circuit as exemplified by circuit 70 in this application is both novel and provides a substantially improved mode of operation with respect to controlling the electrical discharge machining power supply with which it is connected. The circuit is readily adaptable to provide control for a single or a multiple gap machining set-up.

What is claimed is:

1. Apparatus for machining a conductive workpiece by electrical discharges across a dielectric coolant filled gap between a tool electrode and a workpiece including a source of machining power, an electronic output switch having a control electrode and a pair of power electrodes, said power electrodes operably connected between said power source and said gap for providing machining pulses thereto, a drive signal means connected to said control electrode of said switch for rendering it alternately conductive and non-conductive, and a cut-off means operatively connected to said source, wherein the improvement comprises:
   a detecting network connected to the output of said drive signal means;
   a voltage divider coupled to said network;
   a field effect transistor having its principal electrodes connected in series with a positive voltage source and a reference voltage source;
   a signal diode connected between said divider and the gate electrode of said field effect transistor; and
   an electronic switching means having its control electrode connected to a principal electrode of said field effect transistor and a principal electrode connected to said cut-off means for actuating it and providing interruption of said power source responsive to a predetermined magnitude voltage change from said drive signal means representative of failure of said output switch.

2. The combination as set forth in claim 1 wherein said apparatus includes a multiple machining gap set-up, each of said gaps having connected to it a different electronic output switch and a different drive signal source, and wherein said detecting network comprises a separate network operably connected to each of said drive signal sources, and wherein a plurality of field effect transistors having their principal electrodes connected in parallel are coupled between said positive voltage source and said reference voltage source for actuating said cut-off means responsive to the operation of any one of said field effect transistors.

3. The combination as set forth in claim 1 wherein said cut-off means comprises a relay and wherein said source of machining power includes a set of normally closed contacts in series therewith, said relay operable to open said contacts and interrupt said machining power source responsive to said drive signal voltage change.

4. Apparatus for machining a conductive workpiece by means of electrical discharges across a dielectric filled gap including a multiple gap set-up wherein there is provided a source of machining power, an electronic output switch having a control electrode and a pair of power electrodes associated with each of said gaps and said source, a drive signal means operatively connected to the control electrode of each of said output switches for turning them on and off in unison, a cut-off means operatively connected to said machining power source and a detecting means operatively connected to said drive signal means, wherein the improvement comprises:
   a plurality of field effect transistors, each having their principal electrodes connected in parallel one to the other;
   a source of reference potential connected to one of said principal electrode terminals;
   a separate gate control circuit coupled between the gate of each of said field effect transistors and said detecting means; and
   an electronic cut-off switch, said switch having its control electrode diode coupled to a like principal electrode of both said field effect transistors for receiving a cut-off signal therefrom representative of output switch failure and thereby actuating said cut-off means to interrupt said machining power source.

5. Apparatus for machining a conductive workpiece by means of electrical discharges across a dielectric coolant filled gap in a plural gap machining set-up wherein there is provided a source of machining power, a separate electronic output switch having a control electrode and a pair of power electrodes associated with each of said gaps and said source, a drive means operatively connected to the control electrode of each of said output switches for turning them on and off in unison, a cut-off means operatively connected to said machining power source and a detecting means operatively connected to said drive means, wherein the improvement comprises:
   a plurality of field effect transistors corresponding to the number of gaps, said field effect transistors having their principal electrodes connected in parallel one to the other;
   a reference voltage source connected to a common principal electrode terminal of said transistors;
   a separate gate control circuit coupled between the gate of each of said field effect transistors and said detecting means; and
   an electronic cut-off switch, said switch having its control electrode diode coupled to a like principal electrode terminal of said field effect transistors for receiving a cut-off signal therefrom and thereby actuating said cut-off means responsive to output switch failure.

6. The combination as set forth in claim 5 wherein a capacitor is connected to the control electrode, said cut-off switch for storing a voltage and rendering it operable responsive to voltage level during normal output switch on-time.

7. The combination as set forth in claim 5 wherein said cut-off means comprises a relay having its contacts connected in series with said source of machining power for interrupting it responsive to failure of any one of said electronic output switches.

8. The combination as set forth in claim 5 wherein said gate control circuit comprises a coupling capacitor, a voltage divider and a signal diode, said diode connected in series with the gate electrode of one of said field effect transistors.

9. The combination as set forth in claim 5 wherein said drive signal means includes a drive transistor stage including a PNP transistor having its emitter coupled to the control electrode of said electronic output switch and wherein said detecting means is further connected to said drive transistor emitter.

10. Apparatus for machining a conductive workpiece by means of electrical discharges across a dielectric coolant filled gap in a plural gap machining set-up wherein there is provided a source of machining power, a separate electronic output switch having a control electrode and a pair of power electrodes associated with each of said gaps and said source, a drive means operatively connected to the control electrode of each of said output switches for turning them on and off in unison, a cut-off means operatively connected to said machining power source and a detecting means operatively connected to said drive means, comprising:

a plurality of field effect transistors corresponding to the number of gaps, said field effect transistors having their principal electrodes connected in parallel one to the other;
  a reference voltage source connected to a common principal electrode terminal of said transistors;
  a separate gate control circuit coupled between the gate of each of said field effect transistors and said detecting means;
  an electronic cut-off switch, said switch having its control electrode diode coupled to a like principal electrode terminal of said field effect transistors for receiving a cut-off signal therefrom and thereby actuating said cut-off means responsive to output switch failure;
  said drive means including a drive transistor stage having a PNP transistor having its emitter coupled to the control electrode of said electronic output switch;
  said detecting means further connected to said drive transistor emitter;
  a pulse generator comprising an astable multivibrator having its output connected to said drive transistors for operating them; and
  a separate cut-off means responsive to gap short circuit operatively connected to said multivibrator for reducing its on-time responsive to said condition, said last mentioned cut-off means further connected to the control electrodes of said field effect transistors for holding them inoperable during said condition.

* * * * *